United States Patent
Peraza

(10) Patent No.: US 8,744,669 B1
(45) Date of Patent: Jun. 3, 2014

(54) FUEL REFILL SENSOR

(71) Applicant: Continental Automotive Systems, Inc., Auburn Hills, MI (US)

(72) Inventor: Luis Roberto Togo Peraza, Zapopan (MX)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 13/774,354

(22) Filed: Feb. 22, 2013

(51) Int. Cl.
*G01M 17/007* (2006.01)

(52) U.S. Cl.
CPC .................................. *G01M 17/007* (2013.01)
USPC ........................................................ 701/32.4

(58) Field of Classification Search
USPC ........................................................ 701/32.4
See application file for complete search history.

(56) References Cited

U.S. PATENT DOCUMENTS

| | | | | |
|---|---|---|---|---|
| 5,301,113 A | * | 4/1994 | To et al. | 701/123 |
| 5,303,842 A | * | 4/1994 | Harp et al. | 220/562 |
| 5,630,528 A | * | 5/1997 | Nanaji | 222/1 |
| 6,484,088 B1 | | 11/2002 | Relmer | |
| 7,028,561 B2 | * | 4/2006 | Robertson et al. | 73/861.79 |
| 7,797,090 B2 | * | 9/2010 | Zanardelli et al. | 701/31.4 |
| 8,042,376 B2 | * | 10/2011 | Yang et al. | 73/1.16 |
| 8,376,185 B2 | * | 2/2013 | Liebal et al. | 222/59 |
| 8,594,861 B2 | * | 11/2013 | Rovik et al. | 701/2 |
| 2003/0195676 A1 | * | 10/2003 | Kelly et al. | 701/29 |
| 2009/0125164 A1 | * | 5/2009 | Perrotta | 701/3 |
| 2010/0332363 A1 | * | 12/2010 | Duddle et al. | 705/34 |
| 2011/0251754 A1 | | 10/2011 | Jones | |
| 2013/0204484 A1 | * | 8/2013 | Ricci | 701/29.4 |

* cited by examiner

*Primary Examiner* — Thomas Tarcza
*Assistant Examiner* — Alex C Dunn

(57) ABSTRACT

A system for providing an indication of the amount fuel dispensed by a fuel dispenser. The system includes a sensor which communicates fuel data to a data storage device to store the fuel data. The fuel data includes the amount of fuel flowing through a filler neck and the total amount of fuel dispensed. A first communication device, such as a smartphone, accesses the data storage device to transfer the fuel data to a server, such that the server stores the fuel data, allowing a second communication device to access the server and obtain the fuel data. The data storage device also receives location information from a GPS module corresponding to the location of where the fuel data is obtained. The system allows users to access the server and locate service stations having the most accurate displays and charge the correct amount of money for the amount of fuel dispensed.

19 Claims, 3 Drawing Sheets

FUEL REFILL SENSOR

FIELD OF THE INVENTION

The invention relates generally to a sensor used to determine the quantity of fuel that has been dispensed into a fuel tank by a fuel dispenser, and the corresponding location information of the fuel dispenser.

BACKGROUND OF THE INVENTION

Gas stations or fuel service stations are commonly used by vehicle drivers for refueling their vehicles. Many of these service stations have a display on the fuel pump which provides an indication of the price of fuel per unit of volume, the total amount of fuel dispensed, and the total cost for the amount of fuel dispensed.

In some instances, various service stations may not accurately report the amount of fuel pumped on the display. Some service stations may do this intentionally to deceive the customer, or the service station may have inaccurate equipment, which then fails to report the amount of fuel pumped correctly. This results in the vehicle driver or customer being incorrectly charged for the fuel pumped.

Accordingly, there exists a need for a device which provides an indication of the amount of fuel dispensed into the fuel tank of a vehicle, allowing the vehicle driver to make a determination as to whether the vehicle driver is charged the correct amount of money for the fuel purchased, and whether to continue to use various service stations to purchase fuel.

SUMMARY OF THE INVENTION

The present invention provides an indication of the amount fuel dispensed by the fuel dispenser at a service station independently of the fuel pump display. This provides a more accurate indication if the purchaser of the fuel is getting the correct amount of fuel corresponding to the amount of fuel purchased, and that the amount of fuel dispensed into the fuel tank corresponds to the amount of fuel indicated on the fuel pump display.

In one embodiment, the present invention is a system for determining the amount of fuel pumped into a fuel tank. The system includes a sensor and a fuel filler neck, where the sensor is mounted on the fuel filler neck. However, it is within the scope of the invention that the sensor may be mounted in any location which allows the sensor to detect the amount of fuel pumped, such as the fuel tank, the inlet of the fuel filler neck, or the like. The system also includes a data storage device, such as a USB flash drive, or the electronic control unit (ECU) of the vehicle. The sensor and a first communication device, such as a smartphone, are in communication with the data storage device, and a global positioning system (GPS) module and a server are in electrical communication with the first communication device, and a second communication device in communication with the server.

The sensor detects the amount of fuel flowing through the fuel filler neck and communicates fuel data to the data storage device to store the fuel data. The fuel data includes the amount of fuel flowing through the filler neck and the total amount of fuel dispensed. The first communication device accesses the data storage device to transfer the fuel data to the server, such that the server stores the fuel data, allowing the second communication device to access the server and obtain the fuel data. The data storage device also receives location information from the GPS module corresponding to the location of where the fuel data is obtained, such as a service station for example. Location information and corresponding fuel data for many different service stations is stored on the server, allowing users to access the server and use service stations that have the most accurate displays and charge the correct amount of money for the amount of fuel pumped.

In one embodiment, the second communication device is also a smartphone, but in other embodiments, the second communication device may be a GPS Device module, or an integrated GPS device, or any other device which may be configured to communicate with and receive information relating to the fuel data and location information from the server. In one embodiment, the data storage device is a USB flash drive that is part of a vehicle instrument cluster, and in another embodiment, the data storage device is part of an electronic control unit.

Once the fuel data and location information for different service stations is obtained, the driver of the vehicle may make a selection to refuel at the service station which has correct and accurate pricing of the amount of fuel purchased.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
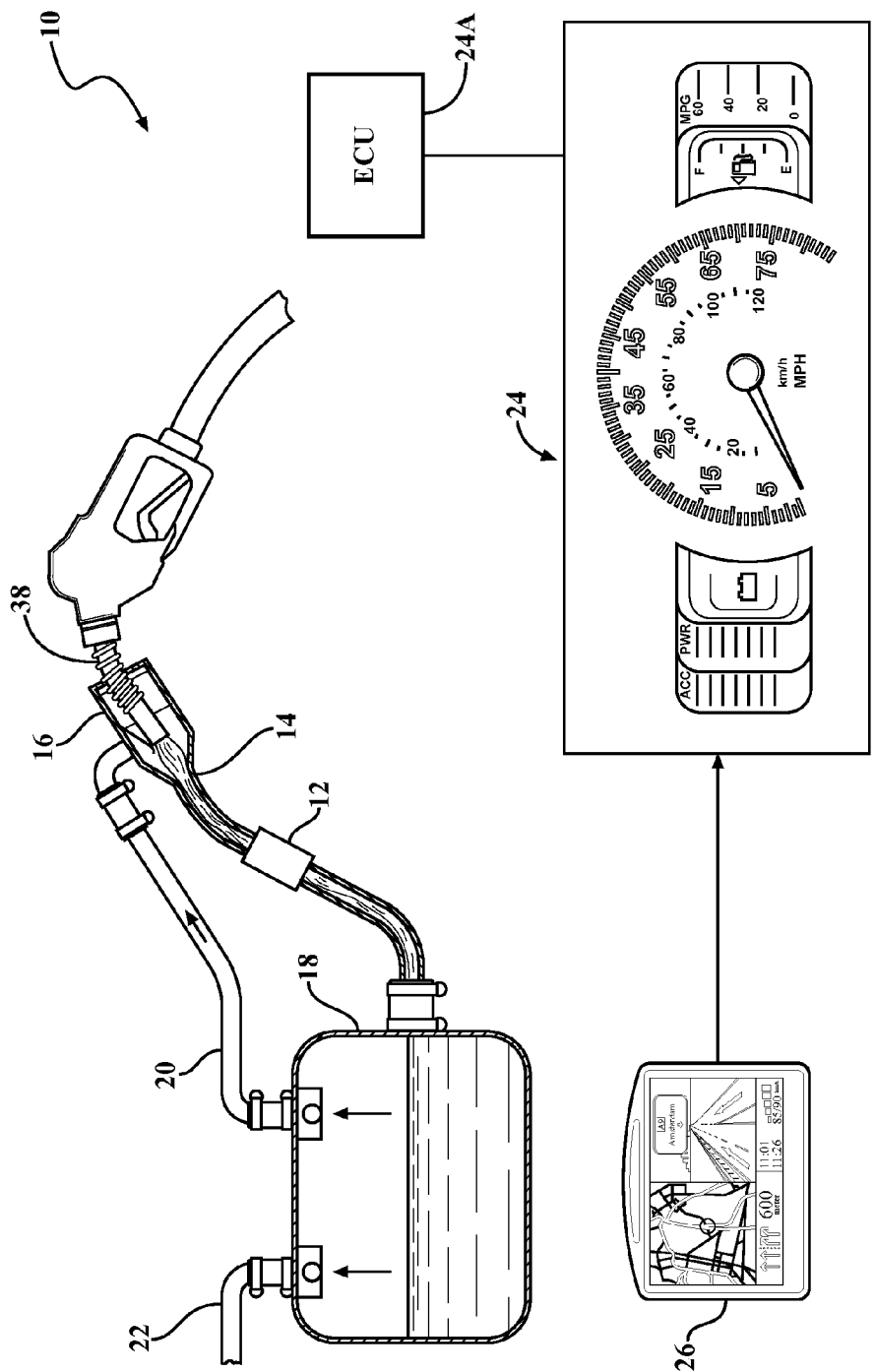
FIG. 1 is a diagram of a system having a fuel refill sensor, according to embodiments of the present invention.

The following description of the preferred embodiment(s) is merely exemplary in nature and is in no way intended to limit the invention, its application, or uses.

An embodiment of a system for determining the amount of fuel dispensed to a vehicle according to the present invention is shown in the Figures generally at 10. The system 10 includes a sensor 12 mounted on a fuel filler neck 14. The neck 14 includes an inlet 16, and the neck 14 is also in fluid communication with a fuel tank 18. There is a vapor return hose 20 fluid communication with the fuel tank 18, and the inlet 16. There is also a vapor canister hose 22 in fluid communication with the fuel tank 18 and a vapor canister (not shown).

The sensor 12 is a flow sensor, and is used to detect the flow of fuel through the neck 14 into the fuel tank 18, and the total amount of fuel pumped into the fuel tank 18. The sensor 12 is in communication with an electronic device, such as an electronic control unit (ECU) of the vehicle, the instrument cluster, or any other electronic device suitable for communication with the sensor 12 that is capable of storing the fuel data containing information relating to how much fuel was delivered into the fuel tank. The communication may be wireless, or in other embodiments, there may be a wire connection between the sensor 12 and the electronic device.

In the embodiment shown in the Figures, the electronic device is the instrument cluster, shown generally at 24. Also in communication with the instrument cluster 24 is a global positioning system (GPS) device 26. The fuel data regarding fuel amount information detected by the sensor 12 and the location of the service station as detected by the GPS device 26 are stored in the instrument cluster 24. In one embodiment, the instrument cluster 24 includes a data storage device, such as a USB flash drive, or in other embodiments, the data is retrieved from the instrument cluster through wireless communication, such as WiFi or Bluetooth. In other embodiments, the data storage device is part of the ECU 24A of the vehicle, and may be in communication with the instrument cluster 24.

Figure 2:
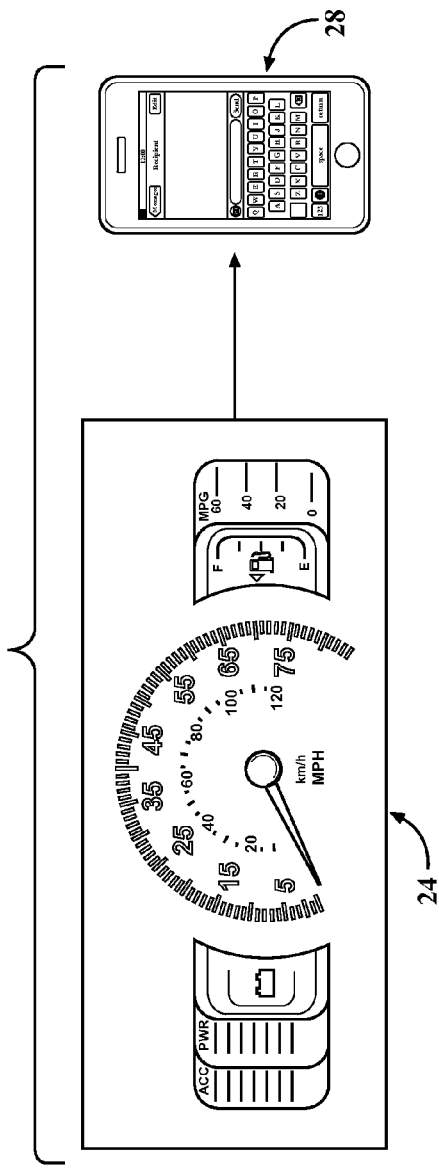
FIG. 2 is a diagram of a smartphone being used to communicate with a vehicle instrument cluster, according to embodiments of the present invention.
Figure 3:
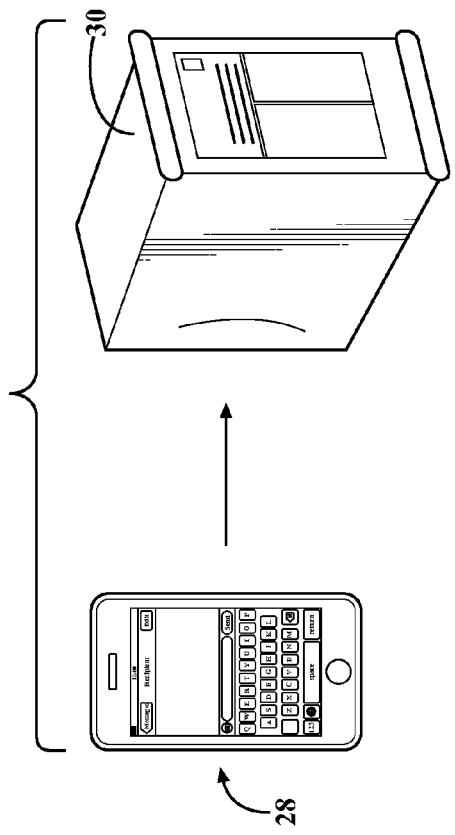
FIG. 3 is a diagram of a smartphone being used to communicate with a server, according to embodiments of the present invention.

Referring now to FIG. 2, the data stored in the electronic device, such as the instrument cluster 24, is then retrieved by a first communications device, which in this embodiment is a smartphone, shown generally at 28. The smartphone 28 is in communication with a server 30 such that the driver may use the smartphone 28 to upload the data to the server 30, as shown in FIG. 3. The server 30 has an application which stores the data about the location information and fuel data from each service station that has been uploaded to the server 30 by various drivers. In one embodiment, the fuel data and location information may be stored for a single country such that a person driving in that particular country accesses the server 30 to determine which service stations have the most accurate correlation between the amount of fuel pumped and the cost shown on the fuel pump display.

Figure 4:
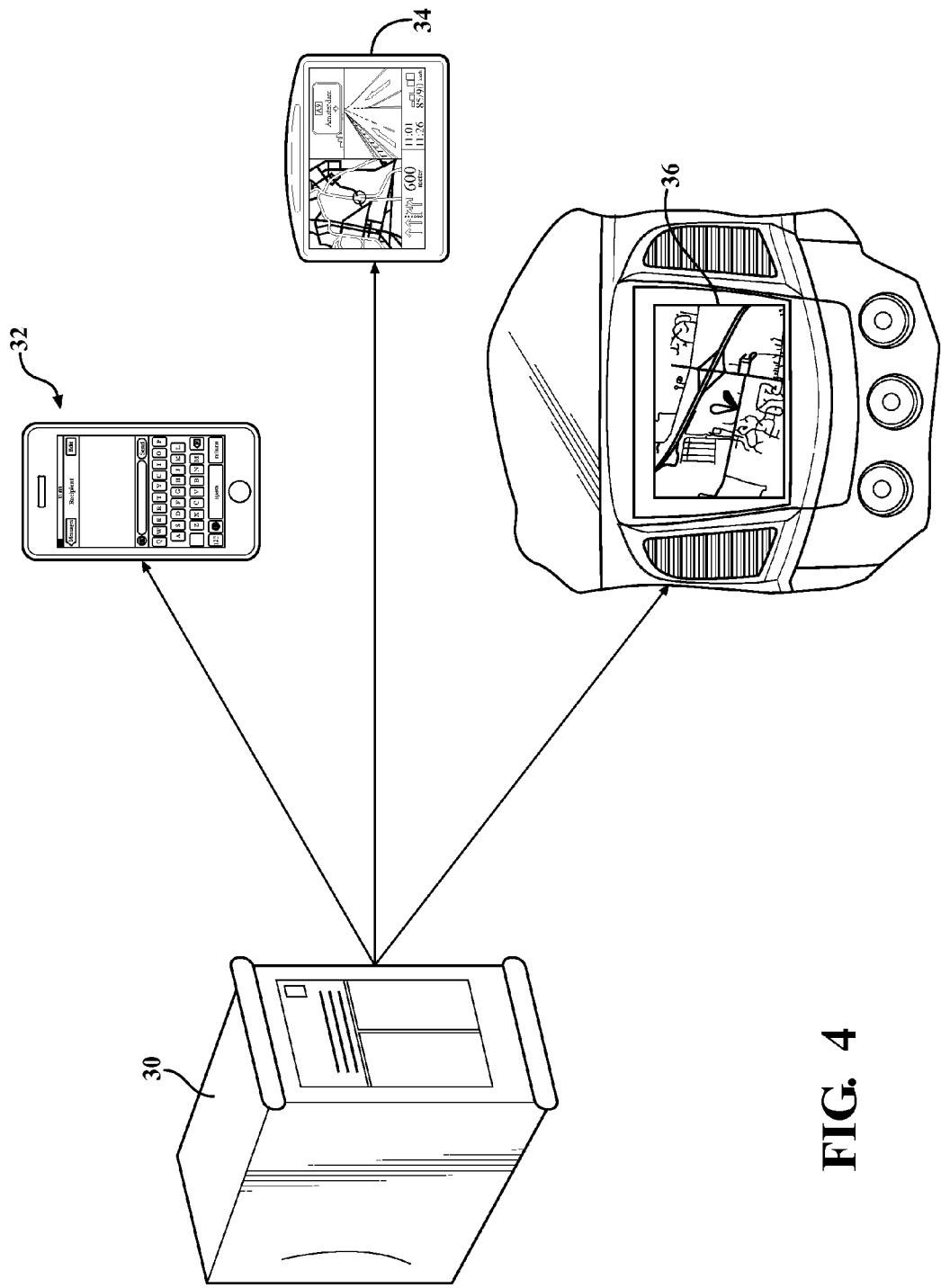
FIG. 4 is a diagram of a server communicating with one or more of a smartphone, a GPS device, or an integrated GPS device.

Referring to FIG. 4, a user or driver accesses the server 30 through the use of a second communications device, such as another smartphone 32, another GPS device 34, or an integrated GPS device 36. The data stored in the server 30 is accessible to many different users, such that drivers of different vehicles may access the information stored on the server 30 and determine which service stations provide the amount of gas from the fuel pump that corresponds to the amount of fuel shown on the display.

In operation, the driver or user of the vehicle stops at a service station to refuel the fuel tank. The nozzle 38 of the fuel pump is at least partially inserted into the inlet 16, and the desired amount of fuel is pumped into the fuel tank 18. The sensor 12 measures the amount of fuel pumped into the tank 18, and the amount of fuel pumped is recorded by the instrument cluster 24, and is part of the fuel data and the location information of the service station as determined by the GPS device 26 is recorded as well. This allows for a determination to be made if the service station accurately provides the amount of fuel corresponding to what is shown on the display of the fuel pump. The information relating to the amount of fuel pumped, the accuracy of the fuel pump display, and location of the service station is then accessed from the instrument cluster 24 through the use of the smartphone 28 and uploaded to the server 30.

When other drivers have a need to refuel their vehicles, they access the server 30 through the use of their smartphone 32, their GPS device 34, or the integrated GPS device 36 in their vehicle, which then downloads the information for each fuel station regarding accuracy of the amount of fuel pumped, and location of each service station. This allows the user of a vehicle to travel to the service station which provides the most accurate reading corresponding to the amount of fuel pumped and money charged for the fuel pumped, and the location of the service station.

The present invention provides the advantage of a vehicle driver being able to access information relating to whether or not the amount of money charged for the amount of fuel pumped corresponds to the price of fuel shown on the display of each fuel pump. If the price charged for the amount of fuel pumped is incorrect, or if the amount of fuel pumped measured by the sensor 12 is less than the amount of fuel pumped shown on the display, the information is accessible by different vehicle drivers, allowing the drivers to avoid service stations which are incorrectly charging for the amount of fuel pumped.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An apparatus, comprising:
a system for determining the amount of fuel pumped into a fuel tank, including:
a sensor for generating fuel data, the fuel data based on the amount of fuel delivered to a fuel tank from one or more of a plurality of service stations;
a data storage device for storing the fuel data, the sensor being in communication with the data storage device;
a first communication device for retrieving the fuel data from the data storage device, and location information of each of the plurality of service stations;
a server in communication with the first communication device such that the server receives the fuel data and the location information from the first communication device, and stores the fuel data and the location information; and
a second communication device in communication with the server such that the second communication device is able to retrieve the fuel data and the location information from the server;
wherein multiple users access the server to obtain the fuel data and the location information of each of the plurality of service stations from the server, allowing the multiple users to obtain information regarding which of the plurality of service stations provides the most accurate correlation between the amount of fuel pumped as measured by the sensor and the amount of fuel received as indicated at each of the plurality of service stations.

2. The apparatus of claim 1, the first communication device further comprising a smartphone.

3. The apparatus of claim 1, further comprising a global positioning system (GPS) module being in communication with the data storage device such that location information of where the fuel data is obtained from each of the plurality of service stations is transferred to the data storage device by the GPS module.

4. The apparatus of claim 1, the second communication device being one selected from the group consisting of a smartphone, a GPS Device, an integrated GPS device, and combinations thereof.

5. The apparatus of claim 1, further comprising a fuel filler neck, wherein the sensor is mounted to the fuel filler neck.

6. The system of claim 1, wherein the data storage device is part of a vehicle instrument cluster.

7. The system of claim 1, wherein the data storage device is part of an electronic control unit.

8. A system for determining the amount of fuel pumped into a fuel tank, comprising:
- a sensor for detecting the amount of fuel delivered to a fuel tank from a plurality of service stations, and generating fuel data indicating the amount of fuel delivered to the fuel tank from each of the plurality of service stations;
- a data storage device for receiving the fuel data from the sensor, and storing the fuel data;
- a global positioning system device (GPS) for detecting the location information of each of the plurality of service stations where the fuel data is obtained, and transferring the location information to the data storage device;
- a first communication device for retrieving the fuel data and the location information of each of the plurality of service stations from the data storage device;
- a server for receiving the fuel data and location information from the first communication device, and storing the fuel data and location information; and
- a second communication device for retrieving the fuel data and location information from the server;
- wherein multiple users access the server to obtain the fuel data and location information obtained by the second communication device, and the multiple users select one of the plurality of service stations having the most accurate correlation between the amount of fuel pumped as measured by the sensor and the amount of fuel received as indicated at each of the plurality of service stations.

9. The system of claim 8, further comprising a fuel filler neck, the sensor being connected to the fuel filler neck.

10. The system of claim 8, the first communication device further comprising a smartphone.

11. The system of claim 8, the second communication device being one selected from the group consisting of a smartphone, a GPS Device, an integrated GPS device, and combinations thereof.

12. The system of claim 8, wherein the data storage device is part of a vehicle instrument cluster.

13. The system of claim 8, wherein the data storage device is part of an electronic control unit.

14. A system for determining the amount of fuel pumped into a fuel tank, comprising:
- a sensor for detecting the amount of fuel delivered to a fuel tank from a plurality of service stations, and generating fuel data indicating the amount of fuel delivered to the fuel tank from the plurality of service stations;
- a fuel filler neck, the sensor mounted on the fuel filler neck;
- a data storage device, the sensor being in communication with the data storage device;
- a first communication device in communication with the data storage device;
- a global positioning system (GPS) module for detecting the location information of each of the plurality of service stations, the GPS module being in communication with the first communication device;
- a server in electrical communication with the communication device; and
- a second communication device in communication with the server, such that the second communication device is able to access the server to obtain the fuel data and location information;
- wherein the sensor detects the amount of fuel flowing through the fuel filler neck and communicates the fuel data containing the amount of fuel flowing through the filler neck with the data storage device to store the fuel data, and the first communication device accesses the data storage device and transfers the fuel data to the server, such that the server stores the fuel data, such that multiple users access the server to select one of the plurality of service stations having the most accurate correlation between the amount of fuel pumped as measured by the sensor and the amount of fuel received as indicated at each of the plurality of service stations.

15. The system of claim 14, wherein data storage device receives the location information from the GPS module corresponding to the location of each of the plurality of service stations where the fuel data is obtained.

16. The system of claim 14, the first communication device further comprising a smartphone.

17. The system of claim 16, the second communication device being one selected from the group consisting of a smartphone, a GPS Device, an integrated GPS device, and combinations thereof.

18. The system of claim 14, wherein the data storage device is part of a vehicle instrument cluster.

19. The system of claim 14, wherein the data storage device is part of an electronic control unit.

* * * * *